(12) United States Patent
Enenkiel

(10) Patent No.: US 7,908,190 B2
(45) Date of Patent: Mar. 15, 2011

(54) SYSTEMS AND METHODS FOR APPLYING TAX LEGISLATION

(75) Inventor: Achim Enenkiel, Karlsruhe (DE)

(73) Assignee: SAP AG, Walldorf (DE)

( * ) Notice: Subject to any disclaimer, the term of this patent is extended or adjusted under 35 U.S.C. 154(b) by 1159 days.

(21) Appl. No.: 11/213,960

(22) Filed: Aug. 30, 2005

(65) Prior Publication Data

US 2007/0055591 A1    Mar. 8, 2007

(51) Int. Cl.
   *G06F 17/22*    (2006.01)
   *G06Q 30/00*    (2006.01)
(52) U.S. Cl. ............................................ 705/31; 705/26
(58) Field of Classification Search ...................... 705/26
   See application file for complete search history.

(56) References Cited

U.S. PATENT DOCUMENTS

| | | | |
|---|---|---|---|
| 5,606,609 A * | 2/1997 | Houser et al. ................. 713/179 |
| 6,064,983 A | 5/2000 | Koehler |
| 6,175,869 B1 | 1/2001 | Ahuja et al. |
| 6,421,683 B1 * | 7/2002 | Lamburt .................... 707/104.1 |
| 7,200,569 B2 * | 4/2007 | Gallagher et al. ............. 705/31 |
| 2002/0042823 A1 | 4/2002 | DeBettencourt et al. |
| 2002/0120527 A1 * | 8/2002 | Lam et al. ........................ 705/26 |
| 2002/0169889 A1 | 11/2002 | Yang et al. |
| 2003/0018661 A1 | 1/2003 | Darugar |
| 2003/0055624 A1 | 3/2003 | Fletcher et al. |
| 2003/0055868 A1 | 3/2003 | Fletcher et al. |
| 2003/0093436 A1 | 5/2003 | Brown et al. |
| 2003/0110242 A1 | 6/2003 | Brown et al. |
| 2003/0144931 A1 | 7/2003 | Stokes et al. |
| 2003/0163513 A1 | 8/2003 | Schaeck et al. |
| 2003/0187841 A1 | 10/2003 | Zhang et al. |
| 2003/0220925 A1 | 11/2003 | Lior |
| 2004/0003130 A1 | 1/2004 | Becker et al. |
| 2004/0045005 A1 | 3/2004 | Karakashian |
| 2004/0064503 A1 | 4/2004 | Karakashian et al. |
| 2004/0083145 A1 * | 4/2004 | Kobayashi et al. ............. 705/31 |
| 2004/0111525 A1 | 6/2004 | Berkland et al. |
| 2004/0122926 A1 | 6/2004 | Moore et al. |
| 2004/0139151 A1 | 7/2004 | Flurry et al. |
| 2004/0243915 A1 | 12/2004 | Doyle et al. |
| 2005/0015643 A1 | 1/2005 | Davis et al. |
| 2005/0038867 A1 | 2/2005 | Henderson et al. |
| 2005/0055279 A1 | 3/2005 | Baur et al. |
| 2005/0198188 A1 | 9/2005 | Hickman |
| 2005/0198206 A1 | 9/2005 | Miller et al. |
| 2006/0031413 A1 | 2/2006 | Enenkiel |

FOREIGN PATENT DOCUMENTS

WO    WO 2004/010297 A1    1/2004

OTHER PUBLICATIONS

European Search Report for Application No. EP 04 01 0067, dated Oct. 20, 2004 (2 pages).

(Continued)

*Primary Examiner* — F. Ryan Zeender
*Assistant Examiner* — Denisse Ortiz Roman
(74) *Attorney, Agent, or Firm* — Finnegan, Henderson, Farabow, Garrett & Dunner, LLP

(57) ABSTRACT

Systems and methods are provided for applying tax legislation. In one implementation, a system is provided that includes means for receiving a request for performing a tax calculation, the request including a first mark-up language document containing transaction data. The system also includes means for performing the tax calculation and means for generating a response, wherein the response includes the first mark-up language document and a result of the tax calculation.

15 Claims, 7 Drawing Sheets

OTHER PUBLICATIONS

Liang, Deron et al., "Fault Tolerant Web Service," Proceedings of the Tenth Asia-Pacific Software Engineering Conference, Dec. 10, 2003, pp. 1-10.

Zhang, Jia et al., "Open Framework Supporting Multimedia Web Services," Proceedings of IEEE Fifth International Symposium on Multimedia Software Engineering, Dec. 10, 2003, pp. 46-53.

* cited by examiner

SYSTEMS AND METHODS FOR APPLYING TAX LEGISLATION

BACKGROUND

I. Technical Field

The present invention generally relates to the field of data processing and, more particularly, to tax related data processing systems and methods.

II. Background Information

The proper calculation of sales taxes, use taxes, and other transaction-based taxes (collectively "transaction taxes" or simply "taxes") is not a trivial task. A single transaction can be taxed by several different government authorities. For the purposes of transaction taxes, there are currently over 7,600 jurisdictions ("tax authorities") in the United States. Multiple jurisdictions can simultaneously exert taxing authority on the same transaction. For example, a single transaction in New York City can result in state, county, city, and local (e.g. zone) taxes. However, different jurisdictions classify transactions differently, resulting in a wide variety of different tax exemptions. For example, an orange can be classified as a taxable fruit in one jurisdiction, while considered a non-taxable beverage in another jurisdiction. Each jurisdiction can have distinctly different exemption rules, tax rates, and maximum tax rates.

Remote transactions (transactions where the buyer and seller are not at the same location) can further complicate the accurate calculation of transaction taxes. Common examples of remote transactions can include transactions that occur via telephone, mail order, the Internet, or some other communication mechanism by which the parties involved in the transaction are located in different jurisdictions. If a merchant has a "nexus" in a particular jurisdiction, that merchant is obligated to collect sales tax on any transactions in the jurisdiction. If no such nexus exists, use taxes are typically incurred by the buyer. Use tax obligations are credited by the amount of sales tax that is paid, but given the variety of different tax rates, the collection of sales tax does not preclude a use tax obligation for the same transaction. In summary, the calculation of transaction taxes can be very complex.

U.S. Published Patent Application No. 2003/0144931 shows a system for calculating transaction-based taxes, such as use tax, sales tax, and other transaction-based taxes. The tax calculator can generate tax calculations using a wide variety of different combinations of one or more transaction characteristics and one or more non-transaction characteristics. A transaction subsystem can be configured to capture a transaction characteristic from an online shopping cart. A subscription subsystem can be used to capture a nexus characteristic that can applied to multiple different tax calculations performed on behalf of a particular merchant by a tax calculator. In some embodiments, different interfaces can be configured to receive different types of data. A transaction interface can be configured to receive transaction characteristics and a merchant interface can be configured to receive non-transaction characteristics which can potentially apply to more than one transaction.

U.S. Pat. No. 6,064,983 discloses a tax server for modelling the tax interpretation of various insurance and annuity products. The system utilizes a plurality of front-end converters to convert data sent by different user applications into a format required by a back-end tax engine. Unfortunately, this disclosure requires the system to have a unique converter for each different user application, and the converted data is converted to a single message structure for a specific tax engine. Thus, before a business can use the system, a converter must be created to accept data from the business. Moreover, the system does not provide add-on capabilities for additional user-based tax functions not provided by the tax engine.

U.S. Published Patent Application No. 2005/0055279 shows a method for processing tax calculation requests. The method comprises submitting a tax calculation request to a tax engine in an industry standard format; identifying and resolving customer-specific extensions in the request; selecting one of a plurality of tax calculators to handle the request; translating the request from the industry standard format to a calculator-specific format for the selected tax calculator; and using the selected tax calculator to process the request in the calculator-specific format.

SUMMARY

In accordance with an embodiment of the present invention there is provided a computer system comprising means for receiving a request for performing a tax calculation, the request carrying a first mark-up language document containing transaction data, means for performing the tax calculation, and means for generating a response, the response carrying the first mark-up language document and a result of the tax calculation.

As disclosed herein, the mark-up language document may be returned together with the result of the tax calculation. This is advantageous in that it facilitates the further processing of the result of the tax calculation, e.g. for performing a tax declaration, for auditable archiving of electronic tax documents and/or for automated use of the result of the tax calculation in an enterprise resource planning (ERP) system.

In accordance with an embodiment of the invention, a second mark-up language document is generated that contains the result of the tax calculation. The second mark-up language document can be forwarded to a business partner together with an electronic bill for automated processing by the business partner and/or it can be archived for later review by the tax authorities and/or used for automated tax reporting purposes.

In accordance with another embodiment of the invention, the result of the tax calculation is entered into the first mark-up language document itself. In this instance, the first mark-up document is received without an electronic signature as the first mark-up document needs to be modified by entering the result of the tax calculation. However, it is preferred to sign the first mark-up language document with the entered result of the tax calculation by the web service that performed the tax calculation.

For example, the extended mark-up language (XML) or an XML dialect that has a particular grammar, such as ebXML, xcbl, 3Y4 XML or one the E-bill formats given in http://www.e-rechnung.at/docs/Rechnungsformate_2.0.pdf is utilized for the first and/or second mark-up language document.

In accordance with an embodiment of the invention, the request carries an electronic signature of the requester. The electronic signature of the requester is verified before a response carrying the result of the tax calculation is returned.

In accordance with yet another embodiment of the invention, an electronic signature is generated for the mark-up language document that carries the result of the tax calculation. For example, the computer system that performs the tax calculation and provides the result to the requester is located in a so called trust center. The electronic signature of the mark-up language document that contains the result of the tax calculation provides evidence that the tax calculation has been performed by an accredited trust center such that it can be relied upon by regulatory authorities and tax offices.

It is to be noted that electronic signature of the first and/or second mark-up language documents is not essential for the performance of the present invention. However, such electronic signatures can be a prerequisite to meet certain regulatory requirements in some countries.

In accordance with another embodiment of the invention, a failure resistant data processing service for performing the tax calculation is provided by means of a replacement system that is invoked if the default data processing component that performs the tax calculation and generates the response becomes unavailable. If such a failure occurs the request for performing the tax calculation is forwarded to the replacement system. The determination of the replacement system can be static or it can be performed dynamically. For example, one or more predefined replacement systems can be stored in a static list. Alternatively, or in addition, potential replacement systems can be identified by performing a database query.

In accordance with an embodiment of the invention, the potential replacement systems are implemented as web services. When the default data processing component that performs the tax calculation and generates the response fails, a predefined universal description discovery integration (UDDI) query is performed. The query returns a list of potential replacement web services. One of the potential replacement web services is selected and the request is forwarded to the selected replacement web service.

In accordance with another embodiment of the invention, a ranking value is calculated for each of the potential replacement web services that are obtained in response to the UDDI query. The calculation of the ranking values can be performed by using one or more attributes of the web services, such as the cost for using the web service. A sorted list that contains the potential replacement web services is generated whereby the calculated ranking values are used for the sorting of the list. The highest ranking web service is selected as the replacement web service and the request is forwarded to the replacement web service. If the replacement web service does not respond within a predefined time window after the request has been forwarded it is assumed that the selected replacement web service is also unavailable and the next highest ranking replacement web service from the list is selected. The response is then forwarded again to that replacement web service in order to perform another try, etc.

Embodiments of the present invention also relate to an electronic apparatus that provides failure resistance to a data processing system for performing tax calculations. If a default data processing component for performing the tax calculations fails, the electronic apparatus identifies a replacement web service and forwards the request to the selected replacement web service.

Embodiments of the present invention further relate to computer-implemented methods for applying tax legislation to a transaction. The transaction can be of various kinds such as business to business, business to consumer and/or business to tax authorities. The further processing of the result of the tax calculation by the business partner, consumer or tax authority is facilitated by providing the result of the tax calculation in the form of a mark-up language document.

Further embodiments of the present invention relate to computer program products that implement such systems and methods for applying tax legislation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
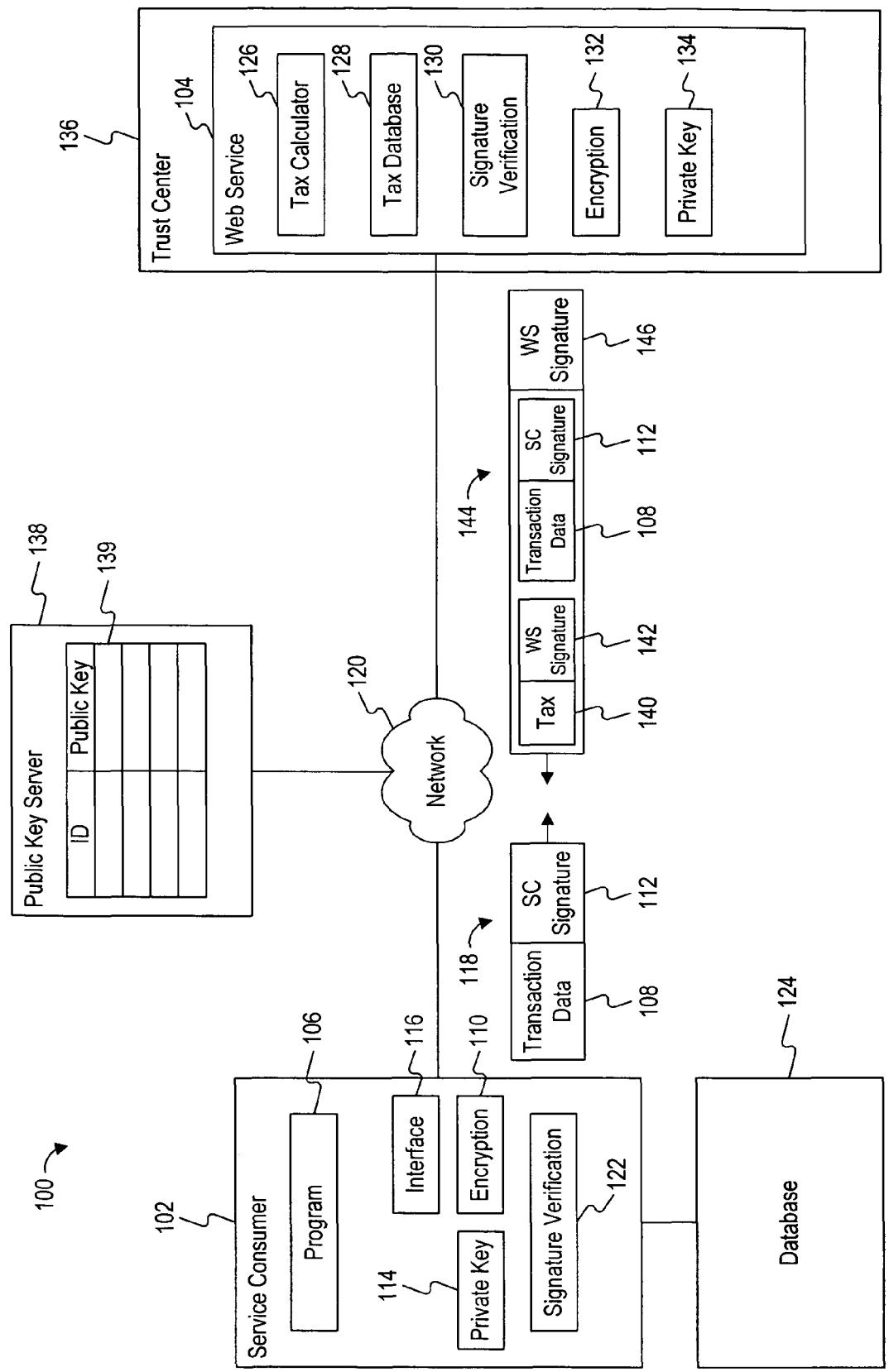
FIG. 1 is a block diagram of an exemplary embodiment of a data processing system.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

FIG. 1 shows an exemplary data processing system 100 that has at least one service consumer 102 and at least one service provider 104. The service consumer 102 has a program 106 for generating an XML document 108 that contains transaction data. The service consumer 102 can have an encryption program 110 for generating a digital signature 112 of the service consumer (SC) 102 using a private key 114 of the service consumer 102; this is however not essential, especially if the XML document 108 needs to be modified by entering the result of the tax calculation by the web service 104.

Further, the service consumer 102 has an interface 116 for sending a request 118 to the service provider 104 via a network 120, such as the Internet. The request 118 carries the XML document 108 and the SC signature 112, if any. Preferably, the request 118 is a simple object access protocol (SOAP) message. SOAP is an application invocation protocol that defines a protocol for exchanging information encoded as XML messages. Preferably, the service provider 104 is implemented as a web service that is responsive to such SOAP messages. Further, the service consumer 102 has a program 122 for verification of an electronic signature. The service consumer 102 is coupled to a database 124.

In one embodiment, the service consumer 102 is a client computer and the program 106 is an application program, such as a home banking program. In another application, the service consumer 102 belongs to an enterprise resource planning system for managing business to business, business to consumer and/or business to tax administration transactions of a corporation. In another application, the service consumer 102 implements an online shop to which various client computers can be coupled for online shopping. In this instance, the service consumer 102 provides electronic bills to the customers that carry the correct tax amounts. In still another application, the service consumer 102 is a so called consolidator that acts as a service hub regarding services related to electronic billing, calculation of tax data as well as archiving and/or reporting of such data.

The service provider 104 has a tax calculator 126 that uses a tax database 128 for performing a tax calculation on the basis of the transaction data received with the XML document 108 from the service consumer 102. The web service 104 has a program 130 for verification of the SC signature 112. Further, the web service provider 104 has an encryption program 132 that uses the private key 134 of the service provider 104 for generating electronic signatures.

In one embodiment, the service provider 104 is located in an accredited trust center 136 that meets security requirements set by the competent government authorities. The integration of the service provider 104 in such a trusted infrastructure ensures that the results of tax calculations performed by the tax calculator 126 and the tax documents generated by the service provider 104 are accepted by the competent government authorities and especially tax offices as auditable documentary evidence.

For the purpose of signature verification the programs 122 and 130 can access a public key server 138 via the network 120. The public key server 138 has a database 139 that contains the public keys of all participants of the trusted infrastructure whereby each participant is identified by its identifier (ID).

In operation, the program 106 generates the XML document 108 that contains transaction data being descriptive of a respective transaction and/or other information that is required to calculate the tax for the transaction under the applicable tax laws. The generation of the XML document 108 invokes the encryption program 110 that generates the SC signature 112 using the private key 114. The resultant request 118 that contains the XML document 108 and the SC signature 112 is sent from the interface 116 of the service consumer 102 to the web service 104 of the trust center 136 via the network 120 such as in the form of a SOAP message.

Receipt of the request 118 by the service provider 104 invokes the signature verification program 130. The program 130 verifies the SC signature 112 by obtaining the public key of the service consumer 102 from the public key server 138 and decrypting the SC signature 112 by means of that public key.

After the SC signature 112 has been verified, the tax calculator 126 is invoked in order to perform a tax calculation on the basis of the transaction data contained in the XML document 108. The tax calculator 126 uses the tax database 128 to perform the tax calculation.

In one embodiment, the result of the tax calculation is entered into the original XML document 108 and the XML document 108 containing the result of the tax calculation is digitally signed by the encryption program 132 and returned to the service consumer 102. However, in this case the XML document 108 is received by the web service 104 without an electronic signature because it is modified by the web service 104 by entering the result of the tax calculation.

In the embodiment shown in FIG. 1, the service provider 104 generates an additional XML document 140 that contains the results of the tax calculation performed by the tax calculator 126. The XML document 140 is digitally signed by the encryption program 132 using the private key 134 of the service provider 104, the service provide is implemented as a web service (WS) in the embodiment considered here. This provides a WS signature 142 for the XML document 140.

The service provider 104 generates a response 144 to the request 118 that contains the XML document 140 and its WS signature 142 as well as the original XML document 108 and the SC signature 112. The concatenated XML documents 108, 140 and the concatenated signatures 112, 142 are digitally signed by the encryption program 132 using the private key 134 in order to provide an additional WS signature 146 for increased security. The response 144 is sent from the service provider 104 via the network 120 to the service consumer 102 such as in the form of a SOAP message.

The service consumer 102 can use the XML document 140 that contains the result of the tax calculation for various purposes. For example, the service consumer 102 can forward the XML document 140 to a business partner for further use by the business partner. Alternatively, or in addition, the service consumer 102 can store the XML document 140 in the database 124 for the purposes of archiving and/or reporting as required by the applicable tax regulations. Alternatively, or in addition, the XML document 140 is stored in the database 124 for later bulk processing, such as for automatic generation of a tax declaration.

As a further alternative, the service consumer 102 can read the relevant results of the tax calculation from the XML document 140 for generation of an electronic bill (E-bill) that is sent to its customer, such as an end consumer that has purchased an item from an online shop implemented by the service consumer 102. The service provider 104 can be used to calculate sales tax, use tax, or any other transaction-based tax (collectively "transaction tax" or simply "tax"). In a preferred embodiment, the service provider 104 can apply and enforce the applicable tax laws in an automated fashion without human intervention.

This is accomplished by use of the tax database 128 and/or expert systems, artificial intelligence and/or other embedded intelligence technologies (collectively "embedded intelligence") that can be incorporated into the service provider 104 for the purposes of tax law expertise. In embedded intelligence embodiments, the service provider 104 itself can apply tax law expertise to the relevant underlying facts in an automated fashion without human intervention.

Transactions typically consist of purchase transactions between a buyer (purchaser) and a seller (merchant). Transactions can also include rent-to-own transactions, leases, bailment arrangements, consignments, and any other contractual exchange of consideration (collectively a "transaction") that can potentially result in a transaction tax. Transactions include face-to-face transactions as well as remote transactions. Remote transactions can occur via: telephone (both land lines and wireless); mail or a parcel service ("mail order"); video conferencing; computer networks such as intranets, extranets, the Internet, an EDI (electronic data interchange) mechanism or other form of computer network, such as the Internet, or through any other mechanism or process by which transactions can occur without a face to face exchange between the parties. The transaction data contained in the XML document 108 can contain one or more of the following data items:

Purchaser

One of the parties to a transaction can be a purchaser, such as an end-customer that has purchased an item by online shopping. The variety of purchasers that the service provider can process coincides with the variety of transactions that can be processed. The purchaser 22 can be, for example, the buyer in a sale transaction; the buyer in a rent-to-own transaction; a lessee in a lease transaction; a bailee in a bailment arrangement; the possessor in a consignment; or any person, organization, partnership, corporation, or entity that receives a good or service in a transaction.

Purchased Item

A purchased item is the contractual consideration of the transaction that is received by the purchaser. The variety of purchased items that can be processed can vary as widely as the types of transactions. Purchased items can be any good, service, or a combination of goods and services (collectively "purchased items"), that can potentially result in a transaction tax. In addition to one-time exchanges, purchased items can also be ongoing forms of consideration such as magazine subscriptions or leased equipment.

Merchant

A merchant is any person, organization, partnership, corporation, or any other entity (collectively "merchant"), engaged in the transaction with the purchaser. The merchant provides consideration in the form of the purchased item to the purchaser in exchange for a payment to the merchant from the purchaser. Merchants can be located at a location in the physical world, at a virtual location on a network provided by service consumer 102, or in both physical and virtual locations. Merchants can have one or more locations, in or more jurisdictions.

Transaction Characteristics

The transaction data can include all data and characteristics that are specific to a particular transaction. Transaction data can include but is not limited to the characteristics of: the particular purchased item(s), the classification of the particular purchased item(s), the identity of the purchaser (such as a purchaser identifier), the jurisdiction in which the transaction occurred, the price of the particular purchased item(s), ancillary costs relating to the purchased item(s) such as shipping costs, and any other information relating to the transaction that is potentially useful in generating a tax calculation by the tax calculator 126.

The location of the transaction (which could be the location of the merchant, the location of the purchaser, or some other location depending on the applicable tax rule) is another example of a transaction characteristic. In some embodiments, locations are in the form of mailing addresses. However, the service provider 104 can use positioning technologies, and may incorporate different forms of location information, such as latitude and longitude coordinates obtained by a satellite based positioning technique such as GPS, TCP/IP information, or potentially any other means for identifying a location.

In addition the XML document 108 can contain other information, such a shipping destination (Ship_To), a shipping origin (Ship_From) and country specific material indications. In essence, the XML document 108 contains all information, such as in the form of data items or tags, that is required for performing the tax calculation under the applicable tax laws and regulations.

In order to facilitate quick and accurate tax calculations, the tax database 128 can include a zip code database populated with the information necessary for identifying the nine-digit zip code from the transaction data that includes a transaction location. The nine-digit zip code, in contrast to the shorter five-digit zip code, can be used to precisely identify the relevant jurisdiction(s) of a transaction. The zip code database can be accessed by the tax calculator 126. The service provider 104 can incorporate other geography-based databases to identify relevant jurisdictions.

Figure 2:
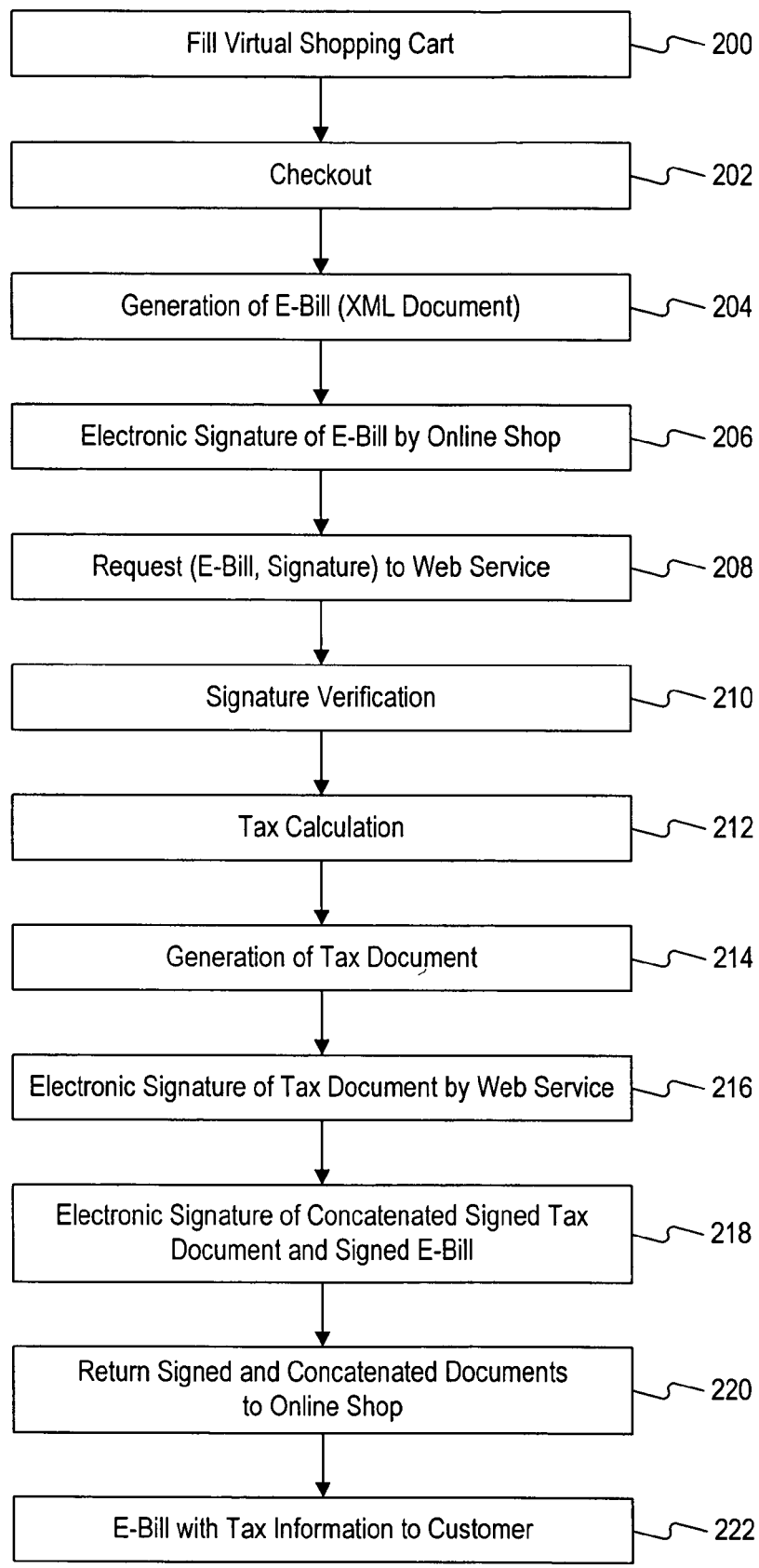
FIG. 2 is a flow diagram illustrating an example of a method according to the present invention.

FIG. 2 shows a flowchart illustrating an exemplary mode of operation of the data processing system 100 of FIG. 1. For the purposes of the embodiment of FIG. 2 it is assumed that the service consumer 102 of FIG. 1 implements an online shop.

In step 200, the customer connects to the online shop and fills his or her virtual shopping cart. In step 200, the customer clicks on a 'checkout' button of the online shop for purchasing of the goods and/or services that have been put into the shopping cart. In response, the online shop generates an electronic bill (E-bill) in the form of an XML document 108 (step 204). The E-bill can be electronically signed by the online shop in step 206 and a request is generated that contains the E-bill and its electronic signature, if any. The request is sent to the service provider 104, such as the web service (step 208).

In step 210, the web service verifies the electronic signature of the request. After successful verification a tax calculation is performed on the basis of the transaction data given in the E-bill (step 212). A tax document is generated in step 214 (cf. XML document 140 of FIG. 1) that contains the results of the tax calculation performed in step 212. The tax document is electronically signed by the web service in step 216. Preferably the tax document 140 contains all data that are required for fulfilment of the applicable tax reporting obligations.

The E-bill, the signature of the E-bill of the online shop, if any, the tax document, and the signature of the tax document of the web service are concatenated and electronically signed by the web service (step 218). A response is generated by the web service that contains these documents and signatures and the response is returned to the online shop in step 220.

The online shop reads the relevant tax information from the XML document 140 and can enter that tax information into the E-bill, if the E-bill is not electronically signed. The E-bill with the completed tax information is then forwarded from the online shop to its customer (step 220). In addition, the XML document 140 is persistently stored in the database for archiving and/or reporting purposes and/or for later automatic generation of a tax declaration by the online shop.

Figure 3:
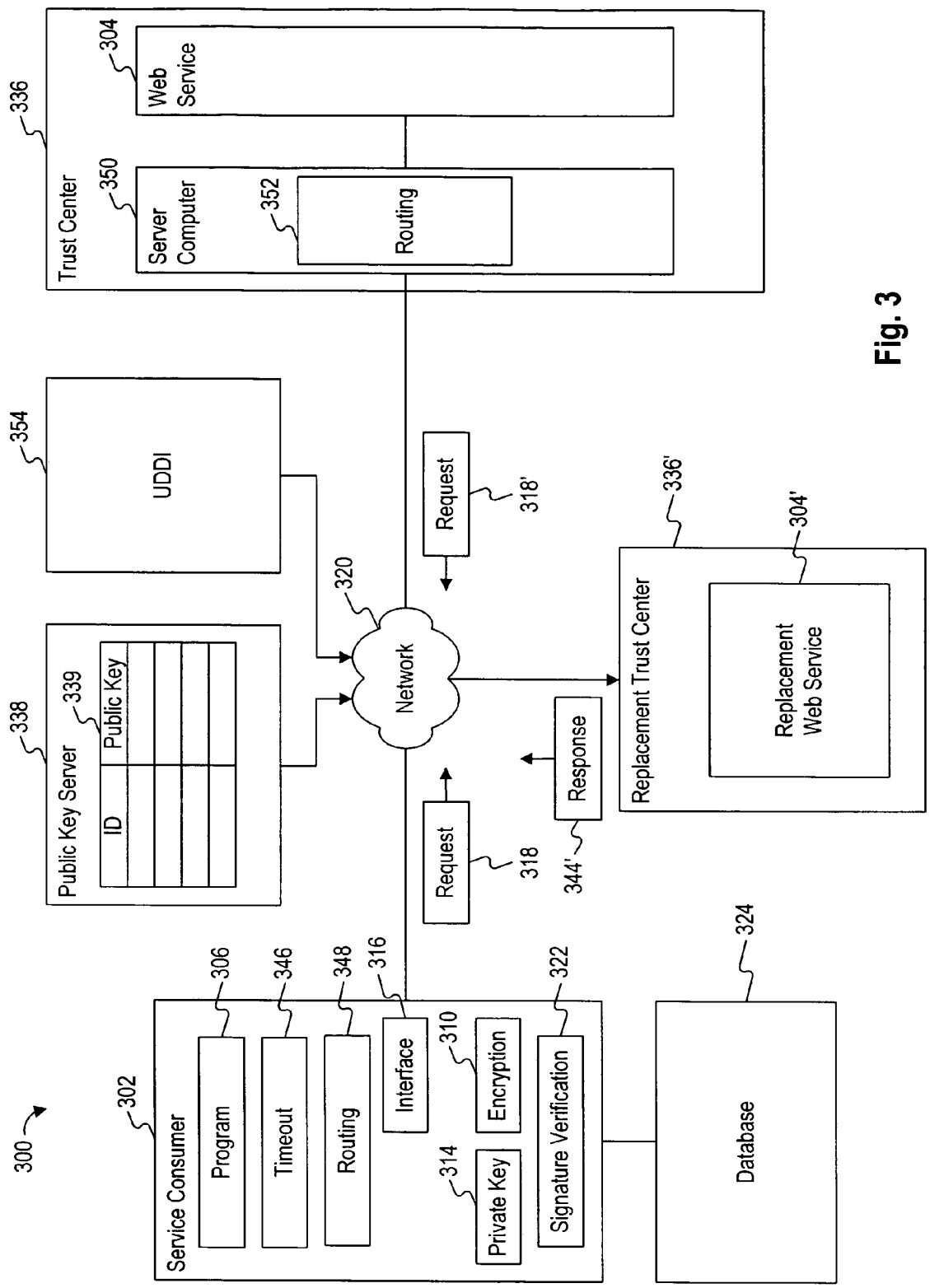
FIG. 3 is a block diagram of a exemplary embodiment of a data processing system.

FIG. 3 shows an alternative embodiment of a data processing system. Elements in the embodiment of FIG. 3 that correspond to elements in the embodiment of FIG. 1 are designated by like reference numerals. The service consumer 302 has a time out component 346 and a routing component 348 in order to provide failure resistance in case the trust center 336 becomes unavailable.

The trust center 336 has a server computer 350 that also has a routing component 352. In normal operation, the server computer 350 receives the request 318 from the service consumer 302 via the network 320 and forwards the request 318 to the services provider 304. If the default service provider 304 becomes unavailable, for example, due to a hardware and/or software failure or due to downtime required for maintenance purposes, the routing component 352 forwards a request 318' to a replacement trust center 336'. The request 318' is identical to the request 318 except that the address of the request 318' has been changed for identification of the replacement trust center 336' as the addressee. The replacement trust center 336' generates a response 344' that it sends to the service consumer 302 in response to the request 318'.

If the service consumer 302 does not receive a response from the trust center 336 or from a replacement trust center 336' within a predefined time window that is set by the timeout component 346, this indicates that not only the service provider 304 is down but also the server computer 350 and/or the replacement trust center 336'. In this instance, the timeout component 346 invokes the routing component 348 of the service consumer 302 such that the service consumer 302 can autonomously identify a replacement trust center to which it resends the request 318. Each of the routing components 352 and 348 can store one or more links to potential replacement trust centers 336' that provide replacement service providers 304', such as replacement web services.

In one embodiment, the default web service as used by the service provider 304 and the replacement web services are described by WSDL (Web Service Description Language) notation stored in WSDL documents. A WSDL document can be stored in numerous ways such as in a file, in a DB2 XML registry/repository, or in a DB2 based UDDI registry, for example. UDDI (Universal Description, Discovery, Integration) is a protocol for describing Web services such that interested parties may easily discover them. Specifications for the respective UDDI registry 354 and use of WSDL in the registry are available at http://www.uddi.org/. Service providers can register their services in a UDDI, specifying technical information about how to invoke the service. Often a WSDL document is stored in a UDDI registry in order to define the messages a particular Web services accepts and generates.

The design of UDDI allows trust centers that own Web service enabled applications to publish data about themselves and their services. By providing this information, UDDI implements a simplified form of searching for those interested in locating a particular service in which to fulfill an application process. The conventional UDDI search is focused on single search criteria such as business name, business location, business categories, business identifier, service type by name, and discovery URL (Uniform Resource Locator).

In operation, the service consumer 302 sends the request 318 to the default service provider 304 provided by the trust center 336. The request 318 is intercepted by the server computer 350. If the service provider 304 is available, the routing component 352 forwards the request 318 to the service provider 304. Otherwise, the routing component 352 changes the addressee of the request 318 which provides the request 318' and it resends the request in the form of request 318' to the replacement service provider 304 provided by the replacement trust center 336'. Hence, the server computer 350 provides a one stage failure protection against failure of the default service provider 304. If the server computer 350 itself goes down due to a server outage, a second stage is required in order to still ensure that the request 318 can be processed.

The second stage of the failure protection mechanism is constituted by the timeout component 346 and the routing component 348 of the service consumer 302. If the service consumer 302 does not receive a response from the trust center 336 or a replacement trust center 336' within a predefined time limit, the timeout component 346 invokes the routing component 348 such that the service consumer 302 autonomously identifies a replacement trust center 336'. In this instance, the service consumer 302 resends its request 318 to an identified replacement service provider 304'.

Figure 4:
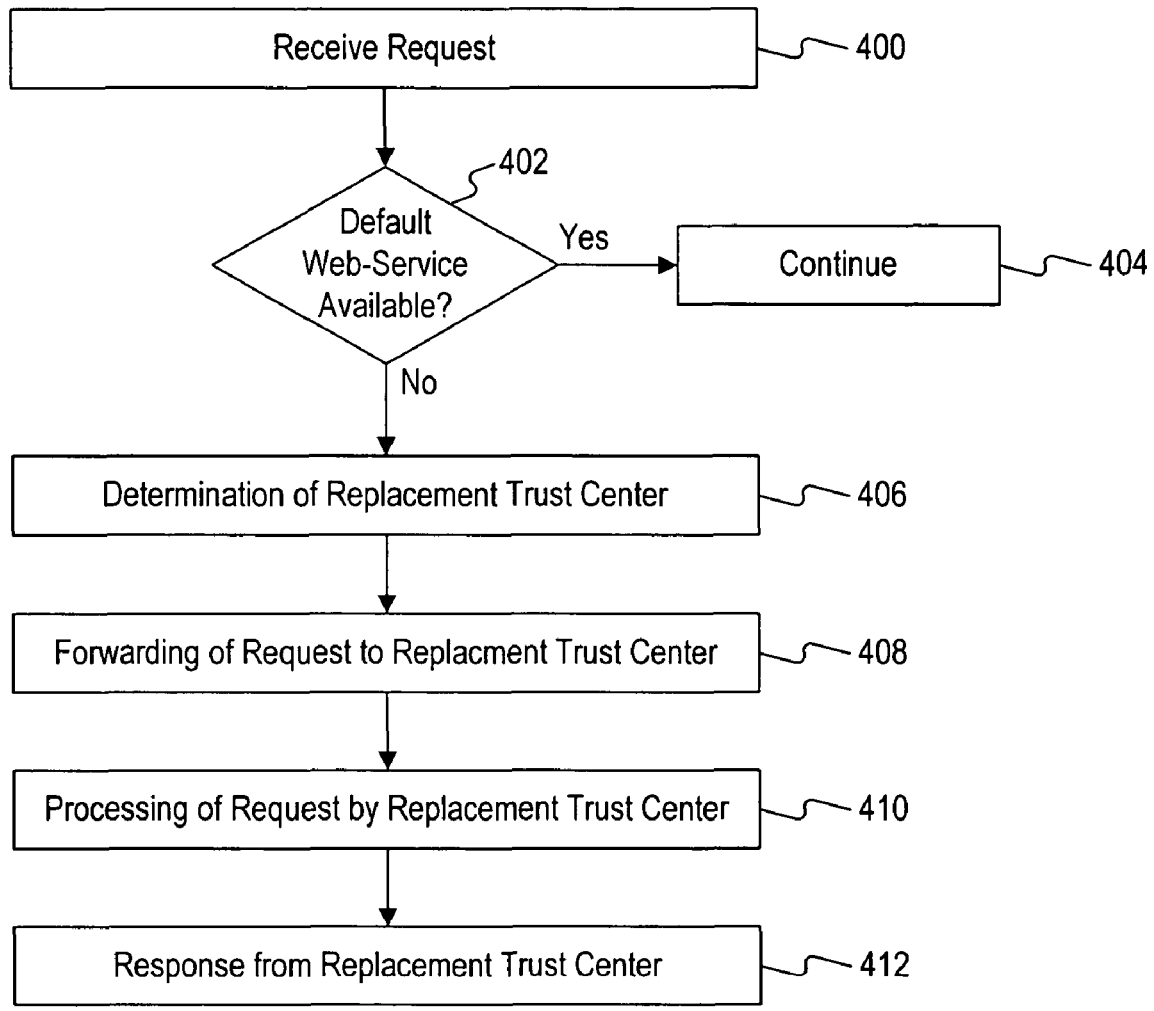
FIG. 4 is a exemplary flow diagram illustrating an exemplary method for providing failure resistance.

FIG. 4 is a flowchart illustrating an exemplary method for the first stage of the failure protection mechanism. In step 400 the server computer receives the request from the service consumer. In step 402, the server computer determines whether the default web service that is used for processing the request is available or not. If the default web service is available, the request is forwarded to the default web service and normal operation continues in step 404.

If the default web service is unavailable, the control goes to step 406 for determination of a replacement trust center that offers a substantially identical replacement web service. The determination of the replacement trust center and its replacement web service can be static by reading the stored URL of the replacement web service that is stored on the server computer or it can be dynamic as it will be explained in greater detail below making reference to FIGS. 6 and 7.

In step 408, the server computer forwards the request to the replacement trust center for processing by the respective replacement web service. In step 410, the request is processed and the generated response is sent from the replacement trust center to the service consumer in step 412.

Figure 5:
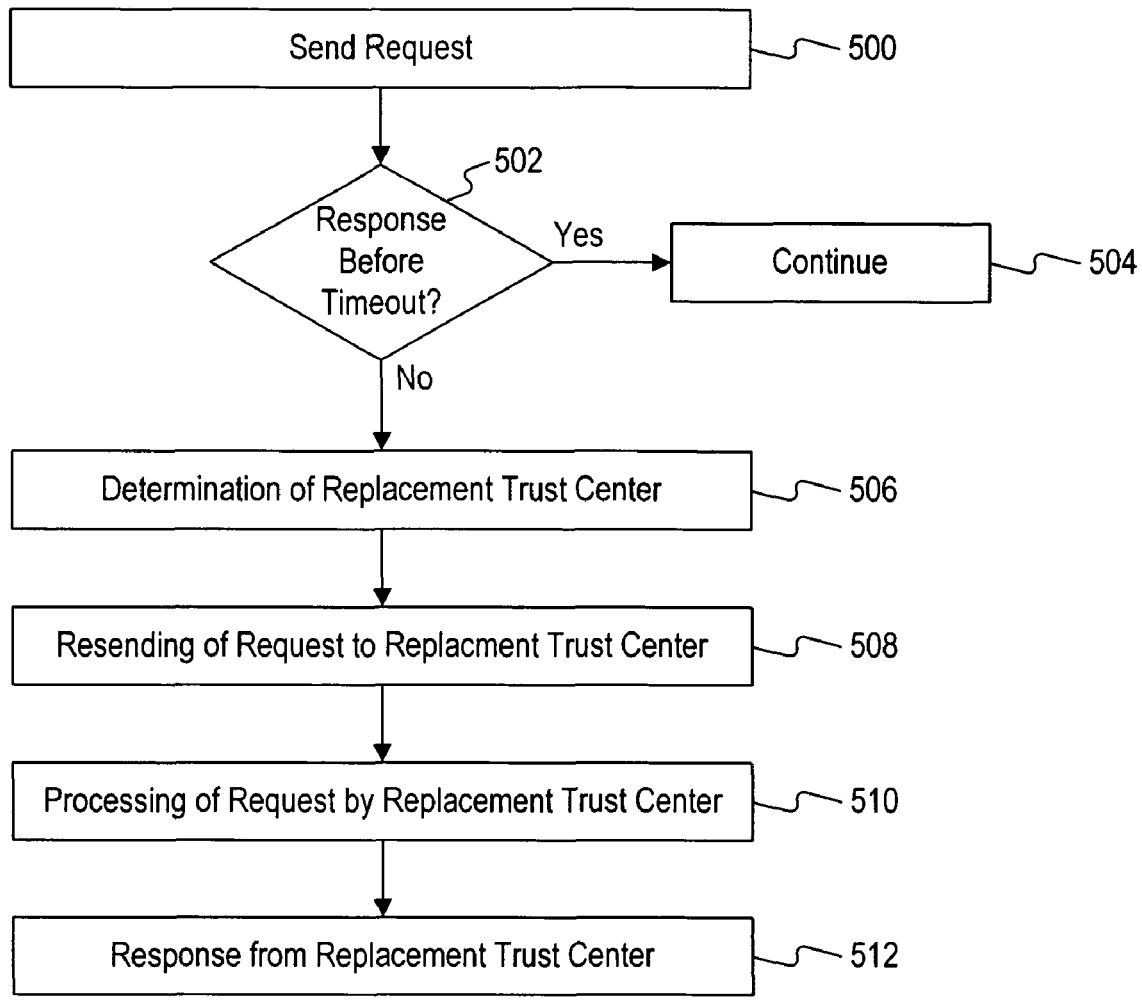
FIG. 5 is a flow diagram illustrating an exemplary method for identification of a replacement trust center.

FIG. 5 illustrates an exemplary method of the second stage of the failure protection mechanism that is implemented by the service consumer itself. In step 500, the service consumer sends its request to the default service provider. In step 502, a determination is made whether a response to the request is received before a timeout condition is fulfilled. If this is the case, normal operation continues in step 504. If no such response is received before the timeout condition is met, the control goes to step 506 for determination of a replacement trust center and a respective replacement service provider. The determination can be static by reading a predefined URL of the replacement service provider or dynamic as explained in greater detail below making reference to FIGS. 6 and 7. In step 508, the service consumer resends its request to the replacement trust center. In step 510, the request is processed by the replacement trust center and a response is provided in step 512 by the replacement trust center to the service consumer.

Figure 6:
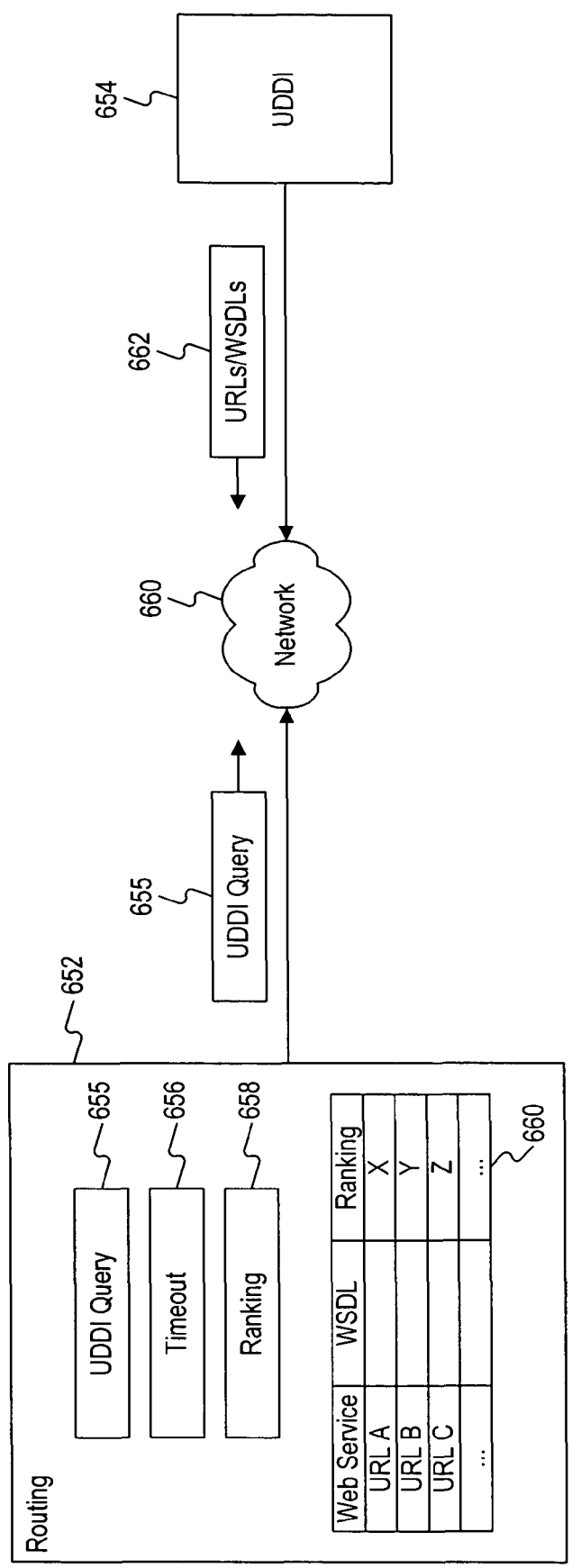
FIG. 6 is a block diagram of an exemplary electronic apparatus for providing failure resistance.

FIG. 6 shows a block diagram of an exemplary electronic apparatus 652, that can be used for implementation of the routing components 352 and/or 348 in the embodiment of FIG. 3. Elements in the embodiment of FIG. 6 that correspond to elements in the embodiments of FIGS. 1 and 3 are designated by like reference numerals. The electronic apparatus 652 stores a predefined UDDI query 655. It also implements a timeout component 646 and it has a ranking component 658. Further, the electronic apparatus 652 has storage for storing a table 660.

In operation, the timeout component 656 is invoked when a request is sent out or forwarded, such as when the service consumer sends its request to the default web service or when the server computer forwards an intercepted request to the default web service. If no response from the default web service or a replacement web service is received within a predefined time limit, the timeout component 656 invokes the following process: first, the UDDI query 655 is sent from the electronic apparatus 652 to the UDDI registry 654 via the network 660. The UDDI registry 654 returns a response 662 that contains the URLs and WSDLs of the web services registered in the UDDI registry 654 that match the UDDI query 655. When the electronic apparatus 652 receives the response 662, the ranking component 658 is invoked in order to calculate a ranking value for each of the potential replacement web services identified in the response 662. The potential replacement web services are sorted by the ranking values which provide the table 660.

In the example considered here the response 662 identifies a plurality of potential replacement web services, such as A, B, C, together with the respective WSDL descriptors. The ranking component 658 calculates a ranking value for each of these web services, such as ranking value X for web service A, ranking value Y for web service B, ranking value Z for web service C, etc.

After the table 660 has been generated, the electronic apparatus 652 reads the URL of the highest ranking web service identified in the table 660. In the present example, this is the URL A of the web service A. The WSDL descriptor of the web service A is also read from the table 660 in order to transform the original request into the format that is required by the replacement web service A.

The electronic apparatus 652 sends the transformed web service request to the replacement web service. Upon receipt of the web service response from the replacement web service it transforms the web service response back into the client domain of the service consumer in order to provide the response in a format that is understandable by the service consumer. However, if no web service response is received from the replacement web service A within a predefined time window specified by the timeout component 656, the URL and WSDL descriptor of the second highest ranking web service B is read from the table 660 in order to attempt usage of the replacement web service B. If replacement web service B is also unavailable, an attempt is made to use the next highest ranking web service C instead, etc.

Figure 7:
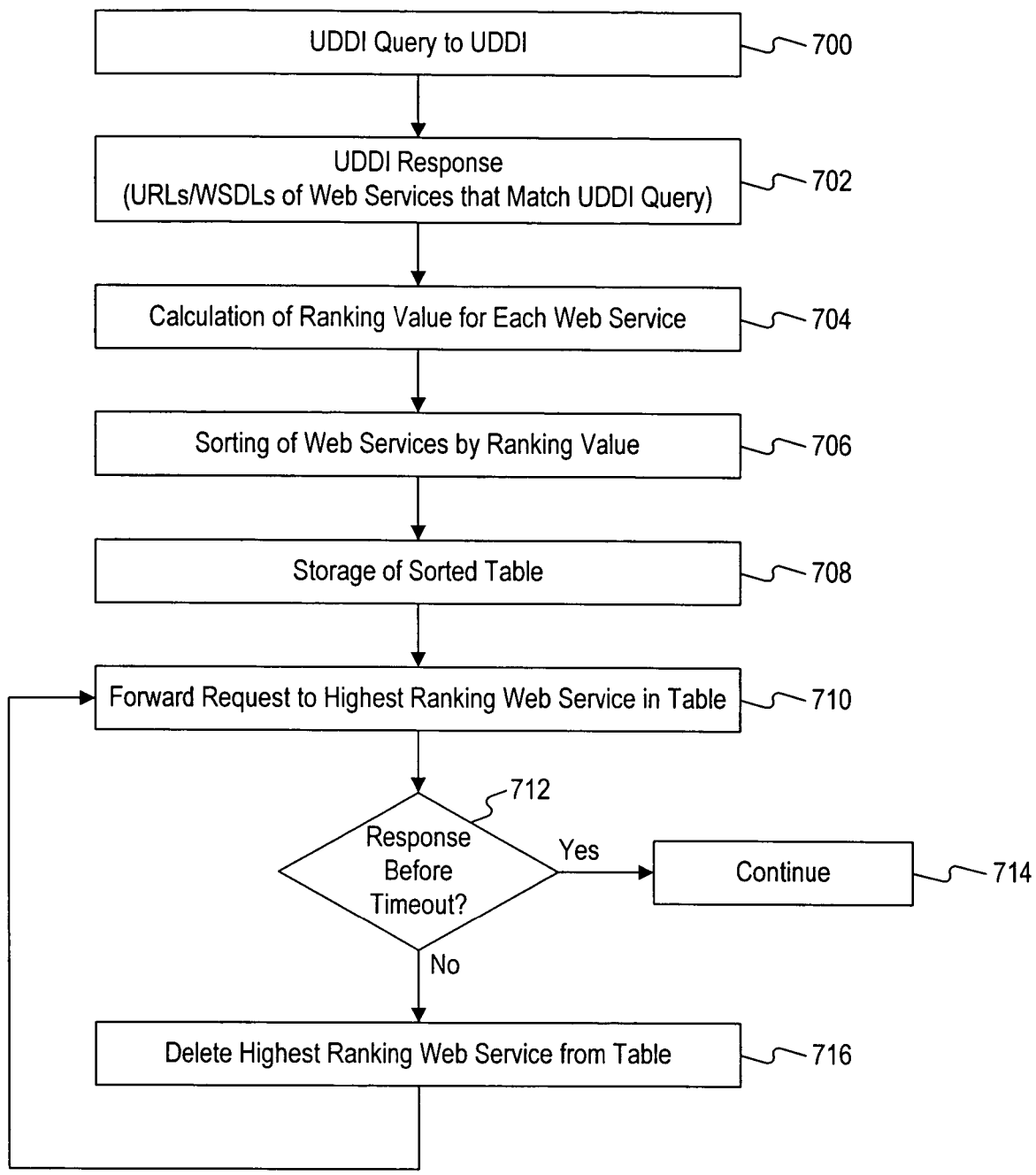
FIG. 7 is a flow diagram illustrating an example of method for identification of a replacement web service.

FIG. 7 shows an exemplary flowchart of an exemplary method for use with FIG. 6. When a response to a service request is not received within a predefined time limit, the UDDI query is sent to the UDDI registry in step 700. In step 702, the UDDI response is received which contains an indication of the URLs and WSDLs of potential replacement web services that have matched the UDDI query. In step 704, a ranking value for each of the potential replacement web services contained in the UDDI response is calculated. The ranking value can be calculated for a given potential replacement web service by evaluating one or more attributes of the web service, such as the cost of the web service, the last update of the web service, and/or other quality criteria.

In step 706, the web services are sorted by their ranking values in order to provide a sorted table of the potential replacement web services in step 708. In step 710, the original request is transformed into the domain of the highest ranking web service of the sorted table in accordance with the WSDL of that web service and the transformed request is forwarded to that web service. In step 712, a determination is made whether a response to the request that has been forwarded in step 710 is received before a timeout condition has been met. If this is the case normal operation continues in step 714. If the opposite is the case, the highest ranking web service is deleted from the sorted table in step 716 and the control goes back to step 710 for a consecutive attempt to use the remaining potential replacement web services contained in the sorted table.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A trust center, comprising:
    a services provider;
    a routing component comprising a processor and a memory storing program instructions that are executed by the processor to:
        receive, from a requester, a request message for performing a tax calculation, the request message including a first mark-up language document containing transaction data signed with an electronic signature of the requester;
        when the services provider is unavailable, forward the request message to a replacement system;
        when the services provider is available, forward the request message to the services provider;
    wherein the services provider is configured to:
        verify the electronic signature of the requester, associated with the request message, using a public key of the requestor retrieved from a public key server;
        perform the tax calculation based on at least the transaction data to determine a result of the tax calculation; and
        generate a response message, the response message comprising:
            a second mark-up language document containing the result of the tax calculation signed with an electronic signature of the provider server; and
            the first mark-up language document received from the requester, signed with the electronic signature of the requester,
            wherein the entire response message is further digitally signed with the electronic signature of the provider server.

2. The trust center of claim 1, wherein the routing component is configured to read a link to the replacement system from a storage component.

3. The trust center of claim 2, wherein the replacement system is a replacement web service, and wherein the instructions that are executed by the processor of the routing component further select the replacement web service from a plurality of web services obtained in response to a predefined universal description discovery integration (UDDI) query.

4. The trust center of claim 3, wherein the instructions that are executed by the processor of the routing component further:
calculate a ranking value for each of the plurality of web services; and
generate a sorted list of the plurality of web services using the respective ranking values as a sorting criterion.

5. The trust center of claim 1, wherein the replacement server serves as a replacement for the unavailable services provider.

6. A computer-implemented method for applying tax legislation to a transaction, comprising:
receiving, by a processor, a request message for performing a tax calculation, the request message including a first mark-up language document containing transaction data signed with an electronic signature of a requester;
when a services provider is unavailable, forward the request message to a replacement system;
when the services provider is available, forward the request message to the services provider;
verify the electronic signature of the requester, associated with the request message, using a public key of the requestor retrieved from a public key server;
performing the tax calculation based on at least the transaction data to determine a result of the tax calculation; and
generating a response message comprising:
a second mark-up language document containing the result of the tax calculation signed with an electronic signature of the provider server; and
the first mark-up language document received from the requester, signed with the electronic signature of the requester,
wherein the entire response message is further digitally signed with the electronic signature of the provider server.

7. The computer-implemented method of claim 6, wherein the step of forwarding includes reading a link to the replacement system from a storage component.

8. The computer-implemented method of claim 7, wherein the replacement system is a replacement web service, and wherein the method further comprises selecting the replacement web service from a plurality of web services obtained in response to a predefined universal description discovery integration (UDDI) query.

9. The computer-implemented method of claim 8, further comprising:
calculating a ranking value for each of the plurality of web services and generating a sorted list of the plurality of web services using the respective ranking values as a sorting criterion.

10. The computer-implemented method of claim 6, wherein the replacement server serves as a replacement for the unavailable services provider.

11. At least one computer-readable storage device comprising computer-executable instructions for performing a method for applying tax legislation to a transaction, the method comprising:
receiving a request message for performing a tax calculation, the request message including a first mark-up language document containing transaction data signed with an electronic signature of a requester;
when a services provider is unavailable, forward the request message to a replacement system;
when the services provider is available, forward the request message to the services provider;
verify the electronic signature of the requester, associated with request message, using a public key of the requestor retrieved from a public key server;
performing the tax calculation based on at least the transaction data to determine a result of the tax calculation; and
generating a response message, the response message comprising:
a second mark-up language document containing the result of the tax calculation signed with an electronic signature of the provider server; and
the first mark-up language document received from the requester, signed with the electronic signature of the requester,
wherein the entire response message is further digitally signed with the electronic signature of the provider server.

12. The computer-readable storage device of claim 11, wherein the step of forwarding comprises reading a link to the replacement system from a storage component.

13. The computer-readable storage device of claim 12, wherein the replacement system is a replacement web service, and wherein the method further comprises selecting the replacement web service from a plurality of web services obtained in response to a predefined universal description discovery integration (UDDI) query.

14. The computer-readable storage device of claim 13, the method further comprising:
calculating a ranking value for each of the plurality of web services and generating a sorted list of the plurality of web services using the respective ranking values as a sorting criterion.

15. The computer-readable storage device of claim 11, wherein the replacement server serves as a replacement for the unavailable services provider.

* * * * *